United States Patent
Hassani et al.

(10) Patent No.: US 12,487,329 B2
(45) Date of Patent: Dec. 2, 2025

(54) IN-VEHICLE BIOMETRICS WITH ULTRAWIDEBAND RADAR

(71) Applicant: Ford Global Technologies, LLC, Dearborn, MI (US)

(72) Inventors: Ali Hassani, Ann Arbor, MI (US); Collin Hurley, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 18/437,455

(22) Filed: Feb. 9, 2024

(65) Prior Publication Data

US 2025/0258278 A1 Aug. 14, 2025

(51) Int. Cl.
| | | |
|---|---|---|
| G01S 7/41 | (2006.01) | |
| B60Q 9/00 | (2006.01) | |
| G01S 13/02 | (2006.01) | |
| G08B 21/02 | (2006.01) | |
| A61B 5/024 | (2006.01) | |

(52) U.S. Cl.
CPC ............. G01S 7/415 (2013.01); B60Q 9/00 (2013.01); G01S 7/417 (2013.01); G01S 13/0209 (2013.01); G08B 21/02 (2013.01); A61B 5/024 (2013.01); A61B 2503/22 (2013.01)

(58) Field of Classification Search
CPC ...... G01S 7/415; G01S 7/417; G01S 13/0209; B60Q 9/00; A61B 5/024; A61B 2503/22; B60W 40/00; B60W 40/08; B60W 2040/00
See application file for complete search history.

(56) References Cited

U.S. PATENT DOCUMENTS

| | | | |
|---|---|---|---|
| 7,663,502 B2 | 2/2010 | Breed | |
| 11,054,511 B2 | 7/2021 | Shamain et al. | |
| 2020/0196942 A1* | 6/2020 | Ozturk | A61B 5/7264 |
| 2020/0309932 A1 | 10/2020 | Zeng et al. | |
| 2020/0317207 A1 | 10/2020 | Sloushch et al. | |
| 2022/0331028 A1* | 10/2022 | Sternitzke | G05D 1/0094 |
| 2024/0175982 A1* | 5/2024 | Cong | A61B 5/6893 |

FOREIGN PATENT DOCUMENTS

| | | |
|---|---|---|
| EP | 4233709 A2 | 8/2023 |
| KR | 102599311 B1 | 11/2023 |
| WO | WO-2008013515 A2 * 1/2008 ........... B66B 1/3476 |

OTHER PUBLICATIONS

Khan, F. et al., "IR-UWB Radar-Based Robust Heart Rate Detection Using a Deep Learning Technique Intended for Vehicular Applications," HAL open science, Aug. 31, 2022, 16 pages.

* cited by examiner

Primary Examiner — Daniell L Negron
(74) Attorney, Agent, or Firm — Frank Lollo; Brooks Kushman P.C.

(57) ABSTRACT

A computer includes a processor and a memory, and the memory stores instructions executable by the processor to receive a plurality of radar data streams from a respective plurality of ultrawideband (UWB) radars in a passenger compartment of a vehicle, generate a combined radar data stream by averaging the radar data streams together, measure a biometric characteristic of an occupant of the passenger compartment based on the combined radar data stream, and actuate a component of the vehicle based on the biometric characteristic.

20 Claims, 3 Drawing Sheets

IN-VEHICLE BIOMETRICS WITH ULTRAWIDEBAND RADAR

BACKGROUND

Some radars use an ultrawideband signal, e.g., a signal with a low energy level spread over a large range of the radio spectrum. The Federal Communications Commission and the International Telecommunications Union Radiocommunication Sector define "ultrawideband" as an antenna transmission for which emitted signal bandwidth exceeds the lesser of 500 MHz or 20% of the arithmetic center frequency.

DETAILED DESCRIPTION

This disclosure describes techniques for controlling a vehicle based on measuring a biometric characteristic of an occupant of a passenger compartment of the vehicle, e.g., a heartrate or a heartrate variability of the occupant. The measurement is performed using radar data from ultrawideband (UWB) radars in the passenger compartment. Using UWB radars is beneficial because UWB radars may be installed on board the vehicle for other uses, e.g., phone-as-a-key (PaaK). A computer of the vehicle is programmed to receive a plurality of radar data streams from a respective plurality of the UWB radars, generate a combined radar data stream by averaging the radar data streams together, measure the biometric characteristic of the occupant based on the combined radar data stream, and actuate a component of the vehicle based on the biometric characteristic. The combined radar data stream can provide sufficiently fine accuracy for measuring the small movements involved in certain biometric characteristics like heartrate. Using the combined radar data from multiple UWB radars can obviate the need for a more powerful sensor such as a millimeter-wave radar. With the biometric characteristic measured, the computer can, e.g., output an alert to the occupant in response to the biometric characteristic exceeding a threshold or transmit a message to a remote server including the biometric characteristic.

A computer includes a processor and a memory, and the memory stores instructions executable by the processor to receive a plurality of radar data streams from a respective plurality of ultrawideband (UWB) radars in a passenger compartment of a vehicle, generate a combined radar data stream by averaging the radar data streams together, measure a biometric characteristic of an occupant of the passenger compartment based on the combined radar data stream, and actuate a component of the vehicle based on the biometric characteristic.

In an example, the instructions may further include instructions to determine a position of the occupant, and average the radar data streams together based on the position. In a further example, the instructions may further include instructions to weight each radar data stream by a distance from the respective ultrawideband radar to the occupant when averaging the radar data streams together.

In another further example, the instructions may further include instructions to determine the position of the occupant by comparing the radar data streams.

In an example, the instructions may further include instructions to weight each radar data stream by a variance of that radar data stream when averaging the radar data streams together.

In an example, the instructions may further include instructions to weight each radar data stream by a noise detected in that radar data stream when averaging the radar data streams together.

In an example, the instructions may further include instructions to, after receiving the radar data streams and before generating the combined radar data stream, align the radar data streams in time. In a further example, the instructions may further include instructions to align the radar data streams in time based on respective second derivatives of the radar data streams.

In an example, the biometric characteristic may be heartrate variability.

In an example, the instructions may further include instructions to apply a filter to each radar data stream. In a further example, the filter may be a bandpass filter isolating frequencies for human heartbeat.

In an example, the instructions may further include instructions to identify a motion by the occupant based on the combined radar data stream, the biometric characteristic characterizing the motion. In a further example, the instructions may further include instructions to classify the motion as a type of human motion based on the combined radar data stream. In a yet further example, the instructions may further include instructions to classify the motion as a type of human motion by executing a neural network classifier with the combined radar data stream as an input.

In an example, the instructions may further include instructions to command a user interface to output an alert to the occupant of the passenger compartment based on the biometric characteristic.

A method includes receiving a plurality of radar data streams from a respective plurality of ultrawideband radars in a passenger compartment of a vehicle, generating a combined radar data stream by averaging the radar data streams together, measuring a biometric characteristic of an occupant of the passenger compartment based on the combined radar data stream, and actuating a component of the vehicle based on the biometric characteristic.

In an example, the method may further include determining a position of the occupant, and averaging the radar data streams together based on the position.

In an example, the method may further include, after receiving the radar data streams and before generating the combined radar data stream, aligning the radar data streams in time.

In an example, the biometric characteristic may be heartrate variability.

In an example, the method may further include commanding a user interface to output an alert to the occupant of the passenger compartment based on the biometric characteristic.

With reference to the Figures, wherein like numerals indicate like parts throughout the several views, a computer 105 includes a processor and a memory, and the memory stores instructions executable by the processor to receive a plurality of radar data streams 200 from a respective plurality of ultrawideband (UWB) radars 110 in a passenger compartment 115 of a vehicle 100, generate a combined radar data stream 215 by averaging the radar data streams 200 together, measure a biometric characteristic of an occupant 140 of the passenger compartment 115 based on the combined radar data stream 215, and actuate a component 120 of the vehicle 100 based on the biometric characteristic.

Figure 1:
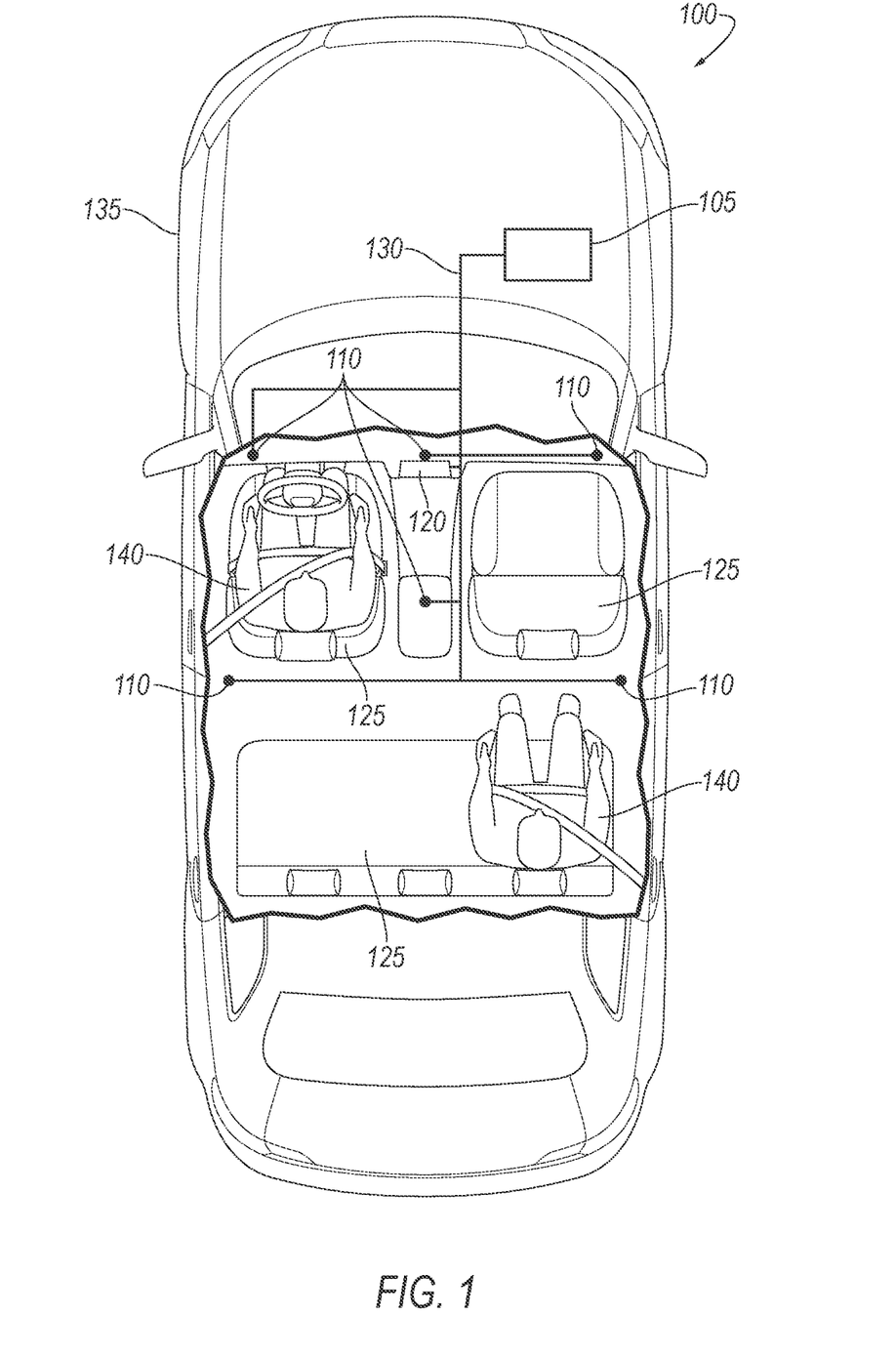
FIG. 1 is a top diagrammatic view of an example vehicle with a passenger compartment exposed for illustration.

With reference to FIG. 1, the vehicle 100 may be any passenger or commercial automobile such as a car, a truck, a sport utility vehicle, a crossover, a van, a minivan, a taxi, a bus, etc. The vehicle 100 includes the passenger compartment 115, the computer 105, a communications network 130, the UWB radars 110, and other components 120 such as a user interface and/or a transceiver.

The vehicle 100 includes a passenger compartment 115 to house occupants 140, if any, of the vehicle 100. The passenger compartment 115 includes one or more seats 125, e.g., one or more of the seats 125 disposed in a front row of the passenger compartment 115 and one or more of the seats 125 disposed in a second row behind the front row. The passenger compartment 115 may also include seats 125 in a third row (not shown) at a rear of the passenger compartment 115. The seats 125 are shown to be bucket seats in the front row and bench seats in the second row, but the seats 125 may be other types. The position and orientation of the seats 125 and components 120 thereof may be adjustable by an occupant 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 130. The communications network 130 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the UWB radars 110 and the other components 120 via the communications network 130.

The UWB radars 110 transmit and receive radio waves. The UWB radars 110 use an ultrawideband signal, e.g., a signal with a low energy level spread over a large range of the radio spectrum. The Federal Communications Commission and the International Telecommunications Union Radiocommunication Sector define "ultrawideband" as an antenna transmission for which emitted signal bandwidth exceeds the lesser of 500 MHz or 20% of the arithmetic center frequency. The UWB radars 110 may use any suitable modulation method, e.g., orthogonal frequency-division multiplexing (OFDM), phase-shift keying (PSK), pulse-position modulation (PPM), etc. The UWB radars 110 are configured to transmit UWB waves and receive reflections of those UWB waves to detect physical objects in the environment. The UWB radars 110 may also be configured to communicate wirelessly with mobile devices using UWB waves, e.g., for PaaK functionality. This can be a benefit of using the UWB radars 110 rather than another type of ranging sensor.

The UWB radars 110 are fixedly mounted to a body 135 of the vehicle 100 in the passenger compartment 115. The UWB radars 110 may be spaced apart from each other, e.g., spread over the passenger compartment 115, which may help an ability to distinguish a location when used for trilateration. For example, the UWB radars 110 may include six UWB radars 110, four located at corners of the passenger compartment 115 and two toward a longitudinal centerline of the passenger compartment 115.

The vehicle 100 includes other components 120 that may be actuated by the computer 105, e.g., ignition, brake system, user interface, transceiver, etc. A user interface presents information to and receives information from an occupant 140 (e.g., the operator) of the vehicle 100. The user interface may be located, e.g., on an instrument panel in the passenger compartment 115 of the vehicle 100, or wherever may be readily seen by the occupant 140. The user interface may include dials, digital readouts, screens, speakers, and so on for providing information to the occupant 140, e.g., human-machine interface (HMI) elements such as are known. The user interface may include buttons, knobs, keypads, microphone, and so on for receiving information from the occupant 140.

A transceiver may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver may be one device or may include a separate transmitter and receiver.

Figure 2:
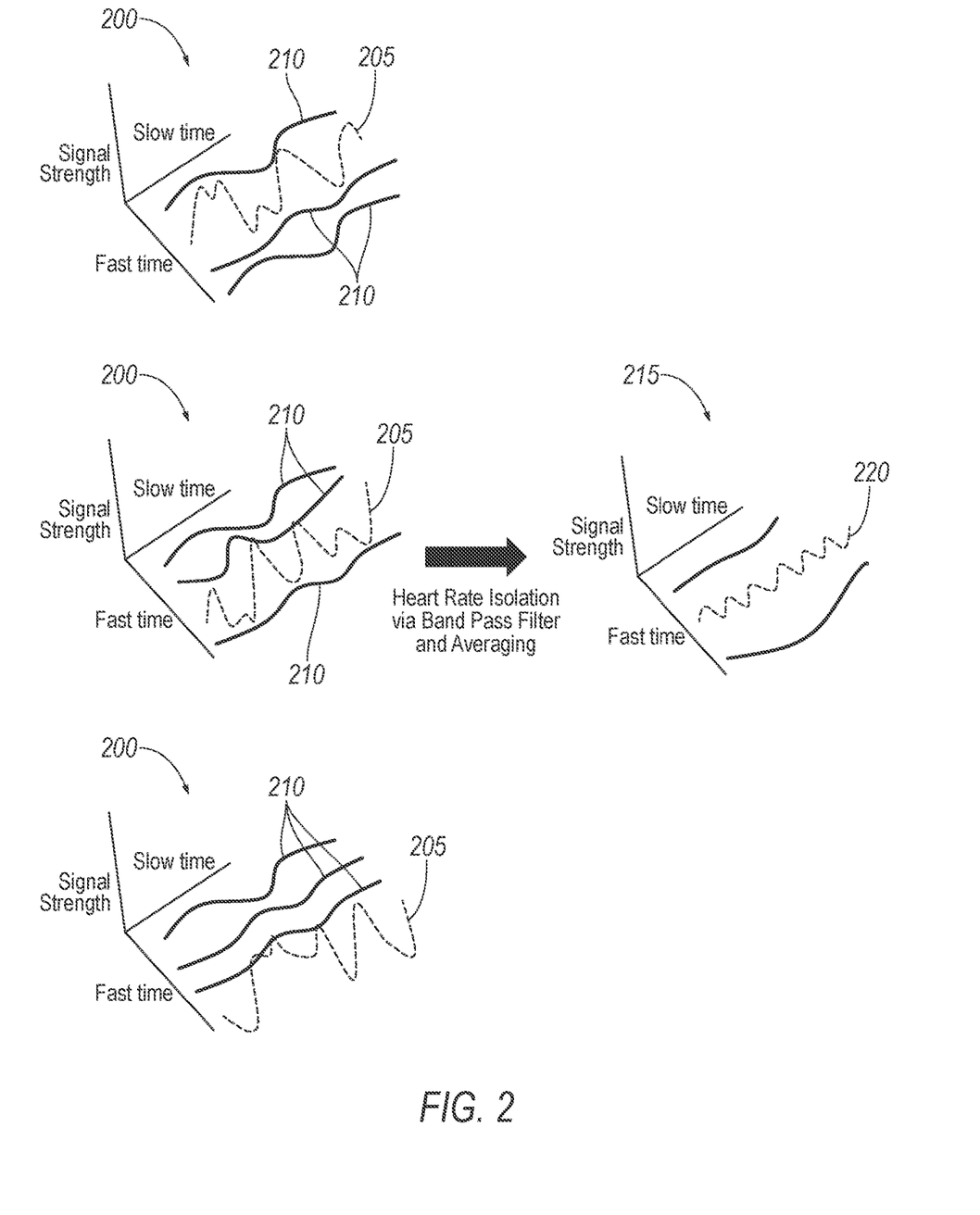
FIG. 2 is a diagram depicting an example of averaging plots of amplitude and fast time versus slow time for example radar data streams into a plot of amplitude and fast time versus slow time for a combined radar data stream.

With reference to FIG. 2, the computer 105 is programmed to receive a plurality of radar data streams 200 from the respective UWB radars 110, e.g., via the communications network 130. Each radar data stream 200 may include return times for UWB pulses and the strength of those pulses as received by one of the UWB radars 110. For example, each radar data stream 200 may be represented as a plot of slow time versus fast time and signal strength, i.e., slow time is an independent variable and fast time and signal strength are dependent variables. FIG. 2 shows three such radar data streams 200 on the left side. The dimension of slow time is measured in the increments of time at which the UWB pulses are transmitted by the UWB radars 110. The dimension of fast time measures the return time for the pulses and may be measured in increments of time at least an order of magnitude more frequent than slow time. A value of fast time indicates the length of time since the most recent pulse was transmitted. The fast time indicates the distance that a pulse traveled before reflecting back to the one of the UWB radars 110. A pulse may reflect back to the same UWB radar 110 that transmitted the pulse or to a different UWB radar 110. The signal strength indicates the strength of the pulse, which can be correlated to the distance to the object and the reflectivity of the object.

Each radar data stream 200 may include multiple signals 205, 210 enduring over the slow time dimension. The different signals 205, 210 can indicate different objects in the passenger compartment 115, e.g., the seats 125, the occupants 140, etc. The computer 105 may identify a set of fast time measurements from one of the radar data streams 200 as a signal 205, 210 based on the fast times being sufficiently close together from one unit of slow time to the next unit of slow time, e.g., each consecutive pair of fast time measurements in the set is within a fast-time threshold of each other. The fast-time threshold may be chosen to indicate that the fast time measurements are likely of the same object.

The computer 105 may be programmed to select one or a subset of the signals 205, 210, referred to as the selected signal(s) 205, from each radar data stream 200 for the processing that is described below. The computer 105 may select one of the signals 205, 210 from a radar data stream 200 based on the signal 205, 210 corresponding to an object that is moving relative to the vehicle 100, e.g., an occupant 140 but not a seat 125. For example, the computer 105 may select the selected signal 205 from the signals 205, 210 based on one or more values characterizing the selected signal 205, e.g., contrast in fast times, variance of fast time over slow time, and/or derivative of fast time with respect to slow time. The contrast of a signal 205, 210 may be a difference between a greatest value of fast time and a smallest value of fast time. The computer 105 may select the selected signal 205 in response to one or more of the values characterizing the signal 205, 210 exceeding a threshold, e.g., peak contrast, variance, contrast normalized by variance, or derivative of fast time with respect to slow time. Alternatively, or additionally, the computer 105 may select the selected signal 205 in response to one or more of the values characterizing the signal 205, 210 being greater for the selected signal 205 than for any of the unselected signals 210 in the same radar data stream 200.

The computer 105 may be programmed to determine a position of an occupant 140 in the passenger compartment 115. The occupant 140 may be represented by one selected signal 205 from each radar data stream 200 (or from each of a subset of the radar data streams 200). The computer 105 may identify the selected signals 205 to use for determining the position of the occupant 140 according to, e.g., a similarity of shape for the selected signals 205. The computer 105 may determine the position of the occupant 140 by comparing the radar data streams 200, e.g., the selected signals 205. For example, the computer 105 may perform a triangulation and/or trilateration calculation based on distances and/or angles from the respective UWB radars 110 to the occupant 140, as indicated by the fast times. For another example, the computer 105 may operate the UWB radars 110 as a phased array and determine the position of the occupant 140 based on a direction of a resulting wave from pulse transmissions by the UWB radars 110 and a distance indicated by the fast times.

The computer 105 may perform a triangulation and/or trilateration calculation based on distances and/or angles from the respective UWB radars 110 to the occupant 140. A triangulation calculation includes determining position information for an unknown point based on angles or directions from known points to the unknown point, e.g., by solving known relationships between parts of a triangle for which the unknown point and the known points are vertices. Triangulation may be used if the UWB radars 110 are equipped for transmitting pulses in different directions, thereby providing the direction or angle to use in the triangulation calculation. A trilateral calculation includes determining position information for an unknown point based on distances from known points. Specifically, the position of the unknown point may be an intersection of at least three spheres with known radiuses and center points. The position of the occupant 140 may be the unknown point, and each sphere is defined by the known position of a UWB radar 110 and the known distance from that UWB radar 110 to the occupant 140, as indicated by the fast time for the selected signal 205 for that UWB radar 110. The computer 105 may determine the position of the occupant 140 using known algorithms for solving three quadratic equations with three unknown variables.

The computer 105 may operate the UWB radars 110 as a phased array to determine the position of the occupant 140. The computer 105 may command the UWB radars 110 to transmit pulses in a particular sequence, e.g., with each UWB radar 110 having a predefined time within each increment of slow time at which to transmit its pulse. The superposition of the pulses results in a combined radio wave moving in a specific direction (even though the individual UWB radars 110 may not be equipped to transmit individual pulses in specific directions). The predefined times may be chosen to generate the specific direction. The predefined times may change from one increment of slow to the next increment of slow time, permitting the UWB radars 110 to collectively scan a range of directions. The signals 205, 210 used to determine the position of the occupant 140 may be selected according to which signals 205, 210 have a signal strength exceeding a threshold. The threshold may be chosen to indicate that multiple superposed pulses reflected back to the UWB radar 110 at the same time. The computer 105 may determine the position based on the direction of the superposed pulses at that increment of slow time and the distances from the UWB radars 110 at that increment of slow time.

The computer 105 may be programmed to apply one or more filters to each radar data stream 200, e.g. to each selected signal 205. The term "filter" is used herein in its signal processing sense, as a process that removes components 120 or features from a signal (here, the radar data). The filters may be applied to the dimensions of fast time versus slow time in a radar data stream 200, i.e., to the radar data indicating distance. The filters may be chosen to isolate data relevant to identifying different types of motion. Multiple filters may be used for different types of motion.

The computer 105 may apply a bandpass filter to the radar data. The term "bandpass filter" is used herein in its signal processing sense, as a filter that passes frequencies within a predefined range and rejects or attenuates frequencies outside the predefined range. The predefined range is stored in the memory of the computer 105, e.g., as a fixed upper bound and fixed lower bound. The bandpass filter may isolate frequencies for human heartbeat. For example, the predefined range, e.g., the upper bound and lower bound, may be chosen to cover typical heartbeat frequencies, i.e., heartrates, e.g., 0.6 to 3.5 Hz. The computer 105 may also apply a gain to the radar data within the predefined range, which can compensate for the small magnitude of movement involved in a human heartbeat.

The computer 105 may be programmed to align the radar data streams 200 in time, e.g., align the selected signals 205 from different UWB radars 110 in time. The computer 105 may shift the selected signals 205 forward or backward in slow time such that an event being analyzed in the radar data has the same starting time for each UWB radar 110. The computer 105 may align the radar data streams 200 in time based on respective second derivatives of the radar data streams 200, e.g., of the selected signals 205. For example, the computer 105 may shift the selected signals 205 such that a change in the second derivatives above a threshold occurs at the same slow time for each selected signal 205. The computer 105 may align the radar data streams 200 after receiving the radar data streams 200 and before generating the combined radar data stream 215, described below. The time alignment can increase the accuracy of the combined radar data stream 215, i.e., of the averaging of the radar data streams 200, described below.

The computer 105 is programmed to generate a combined radar data stream 215 by averaging the radar data streams 200 together. For example, the computer 105 may generate a combined signal 220 by averaging the selected signals 205 together. The combined signal 220 can have a lower signal-to-noise ratio than any of the selected signals 205. The radar data streams 200 are functions of slow time, and the resulting combined signal 220 is thereby a function of slow time. The averaging may be an arithmetic and/or weighted mean, e.g., a summation of the selected signals 205 divided by the number of selected signals 205 or combined weights of the selected signals 205, e.g., as in the following expression:

$$Y(x) = \frac{\sum_{i=1}^{N} w_i y_i(x)}{\sum_{i=1}^{N} w_i}$$

in which Y is the combined signal 220, x is slow time, i is an index of the UWB radars 110, N is the number of UWB radars 110, $w_i$ is the weight for the selected signal 205 for the ith UWB radar 110, and $y_i$ is the fast time of the selected signal 205 for the ith UWB radar 110. The weights may be based on, e.g., respective distances from the respective UWB radars 110 to the occupant 140, respective variances of the radar data streams 200, respective noise detected in the radar data streams 200, and/or respective fixed factors for the radar data streams 200, as will now be described in turn.

The computer 105 may be programmed to average the radar data streams 200 together based on the position of the occupant 140, e.g., by weighting each radar data stream 200 by a distance from the respective UWB radar 110 to the occupant 140 when averaging the radar data streams 200 together. The computer 105 may determine the distance from each UWB radar 110 to the occupant 140 based on the fast time for the selected signal 205 from that UWB radar 110. Alternatively or additionally, the computer 105 may determine the distance from each UWB radar 110 to the occupant 140 based on the position of the occupant 140 and the position of the UWB radar 110, e.g., by calculating the Euclidean distance between the coordinate for the position of the occupant 140 and the coordinate for the position of the UWB radar 110. The coordinates for the position of the UWB radars 110 may be prestored in the memory of the computer 105. The computer 105 may determine the weight $w_i$ for each radar data stream 200 i based on the distance $d_i$ from the UWB radar 110 that generated the radar data stream 200 to the occupant 140. The weight $w_i$ may be inversely related to the distance $d_i$; i.e., the weight $w_i$ may decrease as the distance $d_i$ increases. For example, the weight $w_i$ may be the reciprocal of the distance $d_i$ or the reciprocal of the square of the distance $d_i$.

The computer 105 may be programmed to average the radar data streams 200 together based on the variances of the radar data streams 200, e.g., by weighting each radar data stream 200 by the variance of that radar data stream 200 when averaging the radar data streams 200 together. A higher variance for one of the radar data streams 200 may indicate that the radar data stream 200 is positioned to gather more detailed data about the occupant 140, e.g., about the biometric characteristic of interest. The computer 105 may calculate the variance of, e.g., each selected signal 205, as in the following expression:

$$\sigma_i^2 = \frac{1}{X} \sum_{x=x_0}^{X} (y_i(x) - \mu_i)^2$$

in which $\sigma_i^2$ is the variance for the ith selected signal 205, x is slow time, $x_0$ is the slow time at the beginning of the time window, X is the slow time at the end of the time window, and $\mu_i$ is the mean of the selected signal 205 $y_i$ over the time window from $x_0$ to X. The computer 105 may determine the weight $w_i$ for each radar data stream 200 i based on the variance $\sigma_i^2$ of the radar data stream 200. The weight $w_i$ may be positively related to the variance $\sigma_i^2$; i.e., the weight $w_i$ may increase as the variance $\sigma_i^2$ increases. For example, the weight $w_i$ may be directly proportional to the variance $\sigma_i^2$.

The computer 105 may be programmed to average the radar data streams 200 together based on the noise detected in the respective radar data streams 200, e.g., by weighting each radar data stream 200 by the noise detected in that radar data stream 200 when averaging the radar data streams 200 together. Lower noise for one of the UWB radars 110 can indicate better reliability for the radar data stream 200 from that UWB radar 110 than for the radar data streams from other UWB radars 110. For example, the computer 105 may calculate the signal-to-noise ratio (SNR) for each radar data stream 200, e.g., for each selected signal 205. The computer 105 may calculate the SNR in any suitable manner, as is known. The computer 105 may determine the weight $w_i$ for each radar data stream 200 i based on the noise, e.g., the SNR, of the radar data stream 200. The weight $w_i$ may be inversely related to the noise, e.g., positively related to the SNR; i.e., the weight $w_i$ may decrease as the noise increases, e.g., as the SNR decreases. For example, the weight $w_i$ may be directly proportional to SNR.

The computer 105 may be programmed to average the radar data streams 200 together based on fixed factors for the respective radar data streams 200, e.g., by weighting each radar data stream 200 by a fixed factor. The fixed factors may be chosen based on the physical characteristics and/or positions of the UWB radars 110. For example, if one of the UWB radars 110 is more powerful than the other UWB radars 110, then the radar data stream 200 from that UWB radar 110 may be accorded greater weight. For another example, if one of the UWB radars 110 has a clearer view of the fronts of the seats 125 than the other UWB radars 110, then the radar data stream 200 from that UWB radar 110 may be accorded greater weight. The fixed factors may be prestored in the memory of the computer 105.

The computer 105 may be programmed to identify a motion by the occupant 140 based on the combined radar data stream 215. For example, the computer 105 may classify the motion as a type of human motion and/or measure a biometric characteristic of the occupant 140 from the motion (as will each be described below), based on the combined radar data stream 215. The combined radar data stream 215 can provide sufficient fine accuracy for measuring the small movements involved in certain biometric characteristics like heartrate. Using the combined radar data from multiple UWB radars 110 can obviate the need for a more powerful sensor such as a millimeter-wave radar.

The computer 105 may classify the motion as a type of human motion (from among other types) based on the combined radar data stream 215. The classification of the motion may include a type of living being doing the motion and/or a type of action that the motion is. Types of living beings may include adult human, child, dog, cat, etc. Types of actions may include sitting down, shifting, turning a head, respiration, heartbeat, etc. Some actions may be specific to a type of living being, e.g., sitting down for a person and laying down for a dog.

The computer 105 may classify the motion as a type of human motion by executing a neural network classifier with the combined radar data stream 215 as an input. The neural network classifier may provide as an output a classification of the motion as a specific type, e.g., from a prestored list of types. The neural network classifier may be any suitable type of neural network, e.g., a convolutional neural network. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a down-sampling operation along spatial dimensions; and fully connected layers, which generate based on the output of all neurons of the previous layer. The final layer of the convolutional neural network generates a score for each potential type of motion, and the final output is the type with the highest score.

The neural network classifier may be trained to classify motions in training data. The neural network classifier during training may output a classification and a velocity for each motion. The training data may include radar data of different motions paired with ground-truth classifications and ground-truth velocities of the motions. The ground-truth classifications may be derived by performing object recognition on camera data that was recorded simultaneously with the training radar data. The ground-truth velocities may be the first derivative of fast time with respect to slow time for the combined radar data stream 215. The neural network classifier may be trained to minimize a loss function, e.g., via backpropagation. The loss function may include terms for a classification loss and a physics loss. The classification loss may penalize outputted classifications that do not match the ground-truth classifications. The physics loss may penalize the outputted velocity for a magnitude of the difference with the ground-truth velocity. The use of the physics loss can improve the accuracy of the classification outputted by the neural network classifier, compared with training using only the classification loss.

The computer 105 is programmed to measure a biometric characteristic of an occupant 140 of the passenger compartment 115 based on the combined radar data stream 215. For the purposes of this disclosure, a "biometric characteristic" is defined as a measurable feature of a person's body, e.g., fingerprint, iris pattern, gait, etc. For example, the biometric characteristic may characterize the motion, such as respiration rate, heartrate, heartrate variability, etc. Heartrate is the number of beats of a heart per unit of time, e.g., beats per minute. Heartrate variability is the level of variation in the time intervals between heart beats. Heartrate variability may provide an indicator of a possible cardiac event affecting the occupant 140. The computer 105 may calculate the heartrate variability by detecting the peaks in the combined signal 220, measuring the time between the peaks (called "NN intervals"), and performing any suitable time-domain method, e.g., standard deviation of NN intervals (SDNN), standard deviation of the average NN intervals (SDANN), root mean square of successive differences (RMSSD), standard deviation of successive differences (SDSD), NN50, pNN50, NN20, pNN20, estimated breath cycle (EBC), etc. The computer 105 may instead use geometric methods or frequency-domain methods, as are known.

The computer 105 is programmed to actuate a component 120 of the vehicle 100 based on the identification of the motion and/or the biometric characteristic. For example, the computer 105 may command the user interface to output an alert to an occupant 140 of the passenger compartment 115 based on the identification of the motion and/or the biometric characteristic. For another example, the computer 105 may command the transceiver to transmit a message indicating the identification of the motion and/or the biometric characteristic to a remote server. The computer 105 may actuate the component 120 in response to the identification of the motion satisfying a condition, e.g., the biometric characteristics exceeding a threshold. For example, the condition may be that the heartrate variability exceeds a threshold. For another example, the condition may be the classification of motion as moving from one seat to another seat.

Figure 3:
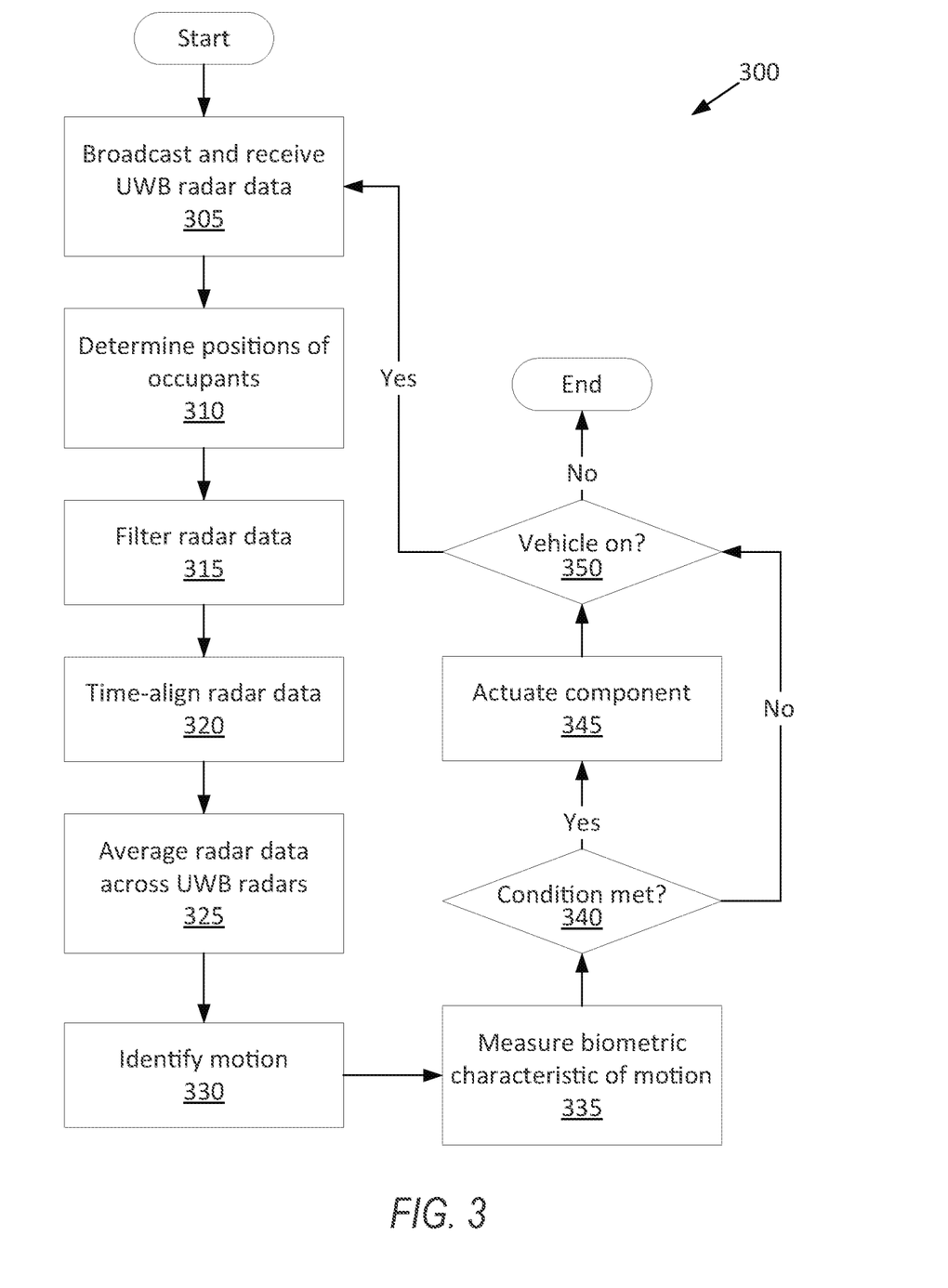
FIG. 3 is a flowchart of an example process for identifying motion in the passenger compartment based on the radar data streams.

FIG. 3 is a flowchart illustrating an example process 300 for identifying motion in the passenger compartment 115 based on the radar data streams 200. The memory of the computer 105 stores executable instructions for performing the steps of the process 300 and/or programming can be implemented in structures such as mentioned above. As a general overview of the process 300, the computer 105 receives the radar data from the UWB radars 110, determines the position of the occupant 140, filters the radar data, aligns the radar data streams 200 in time, generates the combined radar data stream 215 by averaging the radar data streams 200 together, identifies the motion, measures the biometric characteristic of the occupant 140 based on the radar data stream 200, and actuates the component 120 in response to the condition being satisfied. The process 300 continues for as long as the vehicle 100 remains on.

The process 300 begins in a block 305, in which the computer 105 instructs the UWB radars 110 to transmit the pulses and receives the radar data streams 200 from the UWB radars 110, as described above.

Next, in a block 310, the computer 105 determines the positions of the occupants 140, as described above.

Next, in a block 315, the computer 105 selects the selected signals 205 from the radar data streams 200 and applies the filters to the radar data streams 200, as described above.

Next, in a block 320, the computer 105 aligns the radar data streams 200 in time, as described above.

Next, in a block 325, the computer 105 generates the combined radar data stream 215 by averaging the radar data streams 200 together, as described above.

Next, in a block 330, the computer 105 identifies the motion by the occupant 140 based on the combined radar data stream 215, as described above.

Next, in a block 335, the computer 105 measures the biometric characteristic of the occupant 140 of the passenger compartment 115 based on the combined radar data stream 215, as described above.

Next, in a decision block 340, the computer 105 determines whether any conditions for actuating the component 120 have been satisfied, as described above. In response to one of the conditions being satisfied, the process 300 proceeds to a block 345. In response to none of the conditions being satisfied, the process 300 proceeds to a decision block 350.

In the block 345, the computer 105 actuates the component 120 of the vehicle 100 based on the identification of the motion, as described above. After the block 345, the process 300 proceeds to the decision block 350.

In the decision block 350, the computer 105 determines whether the vehicle 100 is still on. In response to the vehicle 100 still being on, the process 300 returns to the block 305 to continue gathering the radar data. In response to the vehicle 100 being turned off, the process 300 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
receive a plurality of radar data streams from a respective plurality of ultrawideband radars in a passenger compartment of a vehicle;
generate a combined radar data stream by averaging the radar data streams together using a weighted average;

weight each radar data stream in the weighted average by at least one of (a) a distance from the respective ultrawideband radar to the occupant or (b) a respective variance of that radar data stream;

measure a biometric characteristic of an occupant of the passenger compartment based on the combined radar data stream; and actuate a component of the vehicle based on the biometric characteristic.

2. The computer of claim 1, wherein the instructions further include instructions to determine a position of the occupant, and average the radar data streams together based on the position.

3. The computer of claim 2, wherein the instructions further include instructions to weight each radar data stream in the weighted average by the distance from the respective ultrawideband radar to the occupant.

4. The computer of claim 2, wherein the instructions further include instructions to determine the position of the occupant by comparing the radar data streams.

5. The computer of claim 1, wherein the instructions further include instructions to weight each radar data stream in the weighted average by the respective variance of that radar data stream.

6. The computer of claim 1, wherein the instructions further include instructions to weight each radar data stream by a noise detected in that radar data stream when averaging the radar data streams together.

7. The computer of claim 1, wherein the instructions further include instructions to, after receiving the radar data streams and before generating the combined radar data stream, align the radar data streams in time.

8. The computer of claim 7, wherein the instructions further include instructions to align the radar data streams in time based on respective second derivatives of the radar data streams.

9. The computer of claim 1, wherein the biometric characteristic is heartrate variability.

10. The computer of claim 1, wherein the instructions further include instructions to apply a filter to each radar data stream.

11. The computer of claim 10, wherein the filter is a bandpass filter isolating frequencies for human heartbeat.

12. The computer of claim 1, wherein the instructions further include instructions to identify a motion by the occupant based on the combined radar data stream, the biometric characteristic characterizing the motion.

13. The computer of claim 12, wherein the instructions further include instructions to classify the motion as a type of human motion based on the combined radar data stream.

14. The computer of claim 13, wherein the instructions further include instructions to classify the motion as a type of human motion by executing a neural network classifier with the combined radar data stream as an input.

15. The computer of claim 1, wherein the instructions further include instructions to command a user interface to output an alert to the occupant of the passenger compartment based on the biometric characteristic.

16. A method comprising:
receiving a plurality of radar data streams from a respective plurality of ultrawideband radars in a passenger compartment of a vehicle;

generating a combined radar data stream by averaging the radar data streams together using a weighted average;

weighting each radar data stream in the weighted average by at least one of (a) a distance from the respective ultrawideband radar to the occupant or (b) a respective variance of that radar data stream;

measuring a biometric characteristic of an occupant of the passenger compartment based on the combined radar data stream; and actuating a component of the vehicle based on the biometric characteristic.

17. The method of claim 16, further comprising determining a position of the occupant, and averaging the radar data streams together based on the position.

18. The method of claim 16, further comprising, after receiving the radar data streams and before generating the combined radar data stream, aligning the radar data streams in time.

19. The method of claim 16, wherein the biometric characteristic is heartrate variability.

20. The method of claim 16, further comprising commanding a user interface to output an alert to the occupant of the passenger compartment based on the biometric characteristic.

* * * * *